(12) United States Patent
Fukazawa et al.

(10) Patent No.: US 8,724,673 B2
(45) Date of Patent: May 13, 2014

(54) PULSE FIBER LASER DEVICE

(75) Inventors: Kodai Fukazawa, Hamamatsu (JP); Masatoshi Fujimoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/639,310

(22) PCT Filed: Jan. 24, 2011

(86) PCT No.: PCT/JP2011/051196
§ 371 (c)(1),
(2), (4) Date: Oct. 25, 2012

(87) PCT Pub. No.: WO2011/125358
PCT Pub. Date: Oct. 13, 2011

(65) Prior Publication Data
US 2013/0038924 A1    Feb. 14, 2013

(30) Foreign Application Priority Data
Apr. 9, 2010 (JP) .............................. P2010-090687

(51) Int. Cl.
*H01S 3/106* (2006.01)
*H01S 3/11* (2006.01)
*H01S 3/067* (2006.01)

(52) U.S. Cl.
CPC ............. *H01S 3/106* (2013.01); *H01S 3/1115* (2013.01); *H01S 3/067* (2013.01); *H01S 3/06791* (2013.01)
USPC .................... 372/98; 372/101; 372/6; 372/94

(58) Field of Classification Search
CPC ........ H01S 3/067; H01S 3/1115; H01S 3/106
USPC .................................................. 372/6, 98, 101
See application file for complete search history.

(56) References Cited

U.S. PATENT DOCUMENTS 5,359,612 A * 10/1994 Dennis et al. .................... 372/18
5,373,526 A * 12/1994 Lam et al. ........................ 372/69
6,034,975 A *  3/2000 Harter et al. ..................... 372/18

(Continued)

FOREIGN PATENT DOCUMENTS

JP    S54-058397    5/1979
JP    2-126108      10/1990

(Continued)

*Primary Examiner* — Mark Hellner
*Assistant Examiner* — Ari M Diacou
(74) *Attorney, Agent, or Firm* — Drinker Biddle & Reath LLP

(57) ABSTRACT

A pulse fiber laser device 1 has a Fabry-Perot type optical resonator, and is provided with an excitation light source 11, an optical coupling unit 12, an amplifying optical fiber 13, a saturable absorber 14, a gradient index lens 15, an optical output unit 16, a dispersion adjusting unit 17, a mirror 21 and a mirror 22. The saturable absorber 14 and the mirror 21, integrated into one body, constitute a saturable absorber mirror 23. The gradient index lens 15 converges the light output from an end face of an optical fiber 32 and outputs the light to the saturable absorber mirror 23, and inputs the light reflected from the saturable absorber mirror 23 into the end face of the optical fiber 32. Thus, there is provided a pulse fiber laser device that enables easy adjustment of the intensity of light incident on a saturable absorber and facilitates miniaturization.

9 Claims, 10 Drawing Sheets

(56) References Cited

U.S. PATENT DOCUMENTS

| | | | |
|---|---|---|---|
| 6,134,003 A * | 10/2000 | Tearney et al. | 356/479 |
| 6,212,216 B1 * | 4/2001 | Pillai | 372/96 |
| 7,436,862 B2 * | 10/2008 | Ilday et al. | 372/6 |
| 7,443,903 B2 * | 10/2008 | Leonardo et al. | 372/97 |
| 7,573,918 B1 * | 8/2009 | Soh et al. | 372/9 |
| 7,602,825 B1 * | 10/2009 | Lin et al. | 372/30 |
| 2001/0001006 A1 * | 5/2001 | Jiang et al. | 372/99 |
| 2002/0097768 A1 * | 7/2002 | Thornton | 372/70 |
| 2006/0198399 A1 * | 9/2006 | Jablonski et al. | 372/10 |
| 2009/0086772 A1 * | 4/2009 | Kasamatsu | 372/18 |

FOREIGN PATENT DOCUMENTS

| | | |
|---|---|---|
| JP | 11-284264 | 10/1999 |
| JP | 2004-260077 | 9/2004 |
| JP | 2006-511949 | 4/2006 |
| WO | 03/104886 | 12/2003 |

* cited by examiner

PULSE FIBER LASER DEVICE

TECHNICAL FIELD

The present invention relates to a pulse fiber laser device.

BACKGROUND ART

A pulse fiber laser device is provided with an amplifying optical fiber and a saturable absorber on a resonant optical path of an optical resonator. Such a laser device is capable of performing mode locking oscillation of the light emitted from the amplifying optical fiber with supplied excitation light in the optical resonator, and outputting a part of the oscillation light to the outside of the optical resonator.

The amplifying optical fiber is used as a laser medium, is an optical fiber in which a rare-earth element such as Yb or Er is added to its core, and by supplying the excitation light of a predetermined wavelength, it is possible to emit light of a predetermined wavelength. The saturable absorber is a substance having a different absorption rate depending on the intensity of the incident light, when the incident light intensity is small, the absorption rate is high, and on the other hand, when the incident light intensity is high, the absorption rate is small and the transmittance is high. Furthermore, when the optical resonator is a Fabry-Perot type resonator reciprocating the light between a first mirror and a second mirror, the saturable absorber is integrated with any of the first mirror and the second mirror to constitute a saturable absorber mirror.

Mode locking is one of ultrashort pulse generation techniques. Mode locking sets up a fixed phase relationship between a plurality of oscillation longitudinal modes simultaneously excited in the amplification band of a laser medium. Mode locking is roughly classified into passive mode locking and active mode locking. A laser device realizing passive mode locking using a saturable absorber can be configured in a simple manner with a small size at a low cost. The saturable absorber used in this case has a function to start mode locking in the optical resonator and stabilize pulse oscillation.

The pulse fiber laser device having an amplifying optical fiber and a saturable absorber arranged on a resonant optical path of an optical resonator and performing mode locking operation can be configured such that a bulk lens is arranged at a space between an end face of the optical fiber and the saturable absorber, and the oscillation light emitted and output from the end face of the optical fiber is converged by the bulk lens and is incident on the saturable absorber. Furthermore, the pulse fiber laser device described in Patent Document 1 is configured such that a saturable absorber mirror is attached to an end face of an optical fiber with the intention of facilitating adjustment of an optical axis.

CITATION LIST

Patent Literature

Patent Document 1: Japanese Patent Application Laid-open No. 2004-260077

SUMMARY OF INVENTION

Technical Problem

When oscillation light emitted and output from an end face of an optical fiber is converged by a bulk lens and is incident on a saturable absorber, a distance between the end face of the optical fiber and the saturable absorber is several tens of millimeters, so that it is difficult to miniaturize devices and it is not easy to adjust the optical axes of their components.

As described in Patent Document 1, when a saturable absorber mirror is attached to an end face of an optical fiber, it is easy to miniaturize devices, however, their components are fixed to each other so that an optical axis can be adjusted at the stage of production, but thereafter the optical axis cannot be adjusted.

Here, in the pulse fiber laser device having an amplifying optical fiber and a saturable absorber on a resonant optical path of an optical resonator and performing mode locking, mode locking operation is affected by the intensity of light incident on the saturable absorber. That is, when the intensity of light incident on the saturable absorber is extremely high, the saturable absorber is burned out in some cases. Also, startability and stability of mode locking operation are affected by the intensity of light incident on the saturable absorber.

The present invention has been made to solve the above problem, and an object thereof is to provide a pulse fiber laser device that enables easy adjustment of the intensity of light incident on a saturable absorber and facilitates miniaturization.

Solution to Problem

A pulse fiber laser device of the present invention is provided with (1) an amplifying optical fiber arranged on a resonant optical path of an optical resonator, (2) an excitation light supply unit supplying excitation light to the amplifying optical fiber, (3) a saturable absorber arranged on the resonant optical path, (4) a first optical fiber which has a first end face opposing the saturable absorber, guides light on the resonant optical path, and outputs the light from the first end face toward the saturable absorber, (5) a first gradient index lens which is attached to the first end face of the first optical fiber, converges the light output from the first end face of the first optical fiber, and outputs the light to the saturable absorber, and (6) an optical output unit outputting a part of oscillation light emitted from the amplifying optical fiber with the excitation light supplied from the excitation light supply unit and oscillated in the optical resonator to the outside of the optical resonator.

Advantageous Effects of Invention

The pulse fiber laser device of the present invention enables easy adjustment of the intensity of light incident on a saturable absorber and facilitates miniaturization.

DESCRIPTION OF EMBODIMENTS

Hereinafter, embodiments of the present invention will be described in detail with reference to the accompanying drawings. In the description of the drawings, the same or similar components will be provided with the same reference symbols, and overlapping description will be omitted.

First Embodiment

Figure 1:
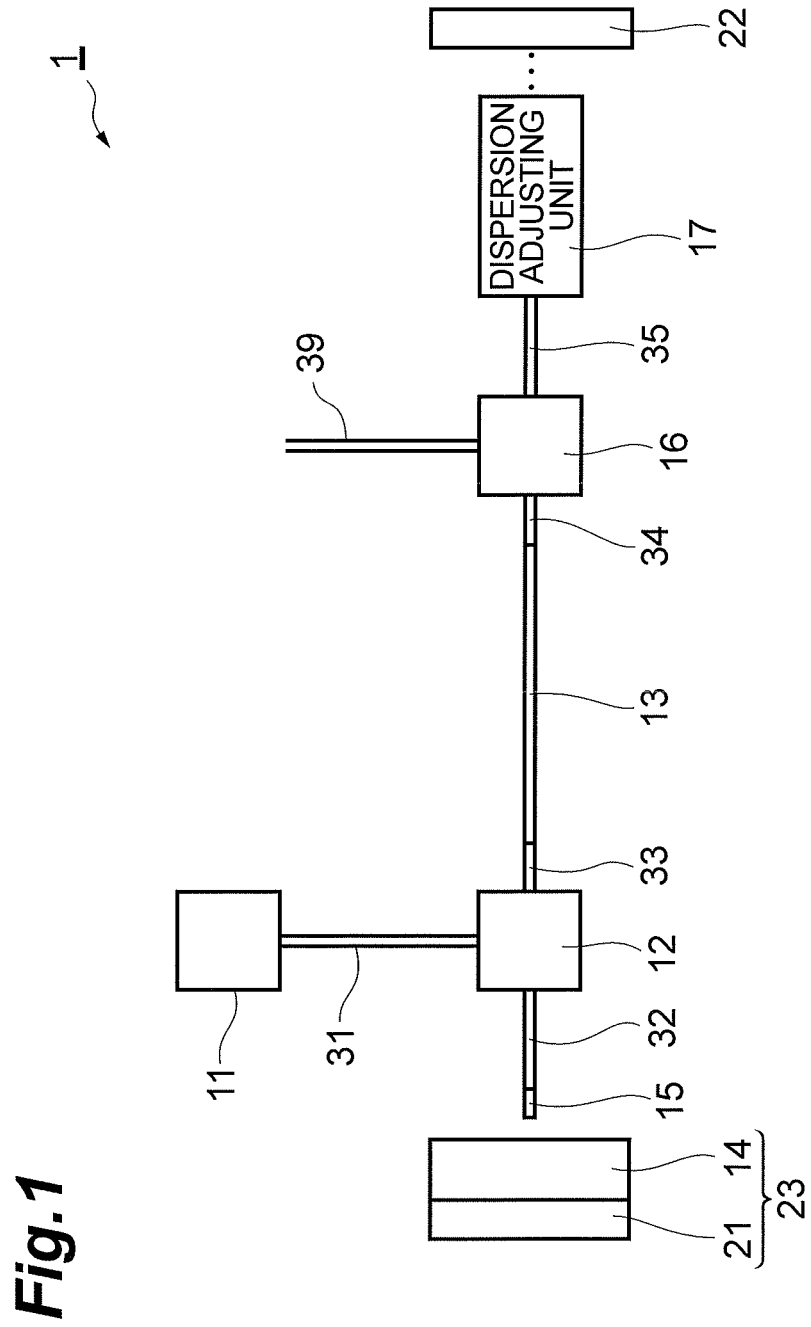
FIG. 1 is a configuration diagram of a pulse fiber laser device 1 according to a first embodiment.

FIG. 1 is a configuration diagram of a pulse fiber laser device 1 according to a first embodiment. The pulse fiber laser device 1 shown in this figure has a Fabry-Perot type optical resonator, and is provided with an excitation light source 11, an optical coupling unit 12, an amplifying optical fiber 13, a saturable absorber 14, a gradient index lens 15, an optical output unit 16, a dispersion adjusting unit 17, a mirror 21 and a mirror 22.

The mirror 21 and the mirror 22 constitute a Fabry-Perot type optical resonator which reciprocates the light between these mirrors. Furthermore, the saturable absorber 14 and the mirror 21 are integrated into one body to constitute a saturable absorber mirror 23. Each of the optical coupling unit 12, the amplifying optical fiber 13, the saturable absorber 14, the gradient index lens 15, the optical output unit 16 and the dispersion adjusting unit 17 is provided on a resonant optical path of the Fabry-Perot type optical resonator, and they are optically connected by a single-mode optical fiber as much as possible.

The amplifying optical fiber 13 is used as a laser medium, is an optical fiber in which a rare-earth element such as Yb or Er is added to its core, and by supplying the excitation light of a predetermined wavelength, it is possible to emit light of a predetermined wavelength (hereinafter referred to as the emitted light). The excitation light source 11 outputs the excitation light to be supplied to the amplifying optical fiber 13 to an optical fiber 31. The excitation light source 11 preferably includes a laser diode.

When a rare-earth element added to the core of the amplifying optical fiber 13 is Yb, the wavelength of excitation light output from the excitation light source 11 is 976 nm, and the wavelength of light emitted from the amplifying optical fiber 13 is 1030 nm. When a rare-earth element added to the core of the amplifying optical fiber 13 is Er, the wavelength of excitation light output from the excitation light source 11 is 980 nm or 1480 nm, and the wavelength of light emitted from the amplifying optical fiber 13 is 1550 nm.

The optical coupling unit 12 is connected to optical fibers 31 to 33. The optical coupling unit 12 includes, for example, an optical fiber coupler. The optical coupling unit 12 inputs the excitation light output to the optical fiber 31 from the excitation light source 11, and outputs the excitation light to the optical fiber 33. The optical coupling unit 12 inputs the emitted light reached through the optical fiber 32, and outputs the emitted light to the optical fiber 33. Also, the optical coupling unit 12 inputs the emitted light reached through the optical fiber 33, and outputs the emitted light to the optical fiber 32.

The excitation light source 11 and the optical coupling unit 12 constitute the excitation light supply unit which supplies excitation light to the amplifying optical fiber. The amplifying optical fiber 13 can generate the emitted light by supplying the excitation light from the optical coupling unit 12 through the optical fiber 33.

The saturable absorber 14 is a material having a different absorption rate depending on the intensity of the incident light, when the incident light intensity is small, the absorption rate is high, and when the incident light intensity is high, the absorption rate is small and the transmittance is high. The emitted light output to the optical fiber 32 from the optical coupling unit 12 is inputted into the saturable absorber 14. That is, the optical fiber 32 has an end face opposing the saturable absorber 14, guides the light on the resonant optical path, and outputs the light from the end face toward the saturable absorber 14.

The gradient index lens 15 has an outer shape of a columnar form, and has a refractive index distribution in the radial direction. The gradient index lens 15 is attached to the end face of the optical fiber 32. It is preferable that the gradient index lens 15 has an outer diameter equivalent to the outer diameter of the optical fiber 32 and is fusion-connected to the end face of the optical fiber 32. The gradient index lens 15 converges the light output from the end face of the optical fiber 32, and outputs the light to the saturable absorber mirror 23. In addition, the gradient index lens 15 inputs the light reflected from the saturable absorber mirror 23 into the end face of the optical fiber 32.

The optical output unit 16 is connected to optical fibers 34, 35 and 39. The optical output unit 16 includes, for example, an optical fiber coupler. The optical output unit 16 inputs the emitted light reached from the amplifying optical fiber 13 through the optical fiber 34 for branching, that is, outputting a branched part of the emitted light to the optical fiber 39 and outputting the rest of the light to the optical fiber 35. The branching ratio to the optical fiber 39 in the optical output unit 16 is, for example, 30%. Further, the optical output unit 16 inputs the emitted light reached through the optical fiber 35, and outputs the emitted light to the optical fiber 34. That is, the optical output unit 16 can output a part of the oscillation light emitted from the amplifying optical fiber 13 with excitation light supplied thereto and oscillated in the optical resonator to the outside of the optical resonator.

The dispersion adjusting unit 17 adjusts the wavelength dispersion of the resonant optical path in the wavelength of the emitted light. The dispersion adjusting unit 17 includes a dispersive element such as a diffraction grating or prism. It is preferable that the dispersion adjusting unit 17 compensates the wavelength dispersion of the amplifying optical fiber 13 and the optical fibers 32 to 35 to decrease the absolute value of entire wavelength dispersion of the resonant optical path in the wavelength of the emitted light.

Figure 2:
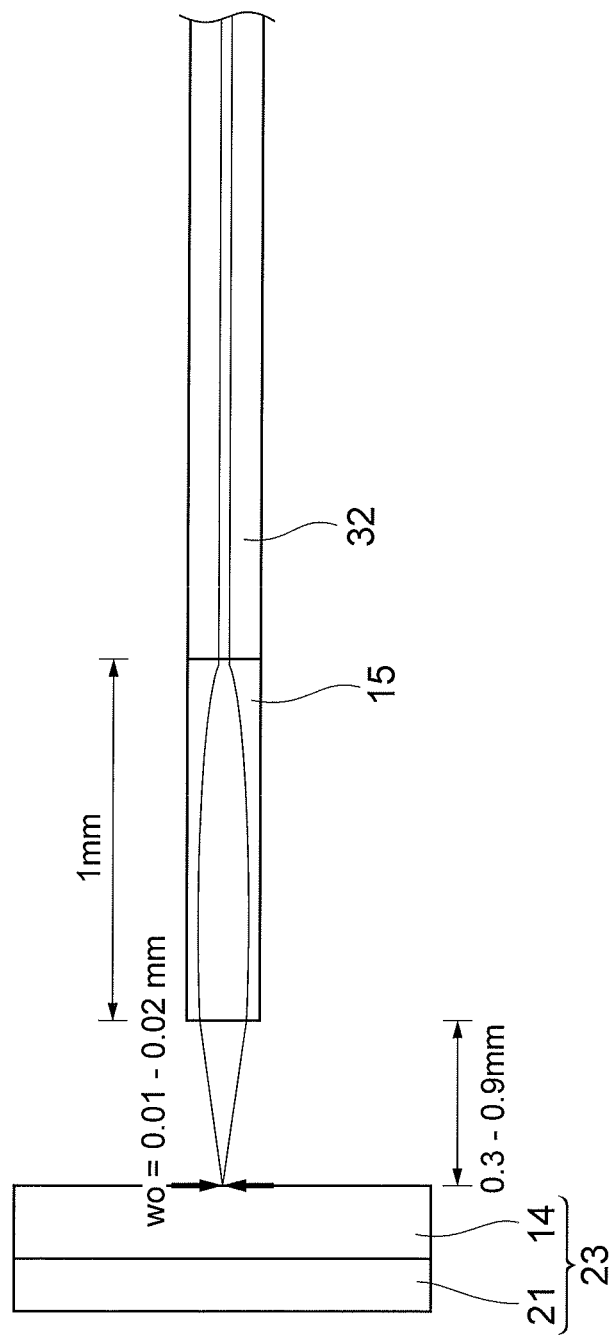
FIG. 2 is a diagram showing a configuration with a saturable absorber 14 and a gradient index lens 15 in the pulse fiber laser device 1 according to the first embodiment.

FIG. 2 is a diagram showing a configuration with the saturable absorber 14 and the gradient index lens 15 in the pulse fiber laser device 1 according to the first embodiment. For example, the outer diameter of the gradient index lens 15 is the same as the outer diameter of the optical fiber 32, that is, 125 μm. The length of the gradient index lens 15 is 1 mm. NA of the gradient index lens 15 is from 0.25 to 0.35. The light converged and output from the gradient index lens 15 has a beam waist diameter of 0.01 mm to 0.02 mm at the position of distance 0.3 mm to 0.9 mm from the gradient index lens 15.

Figure 3:
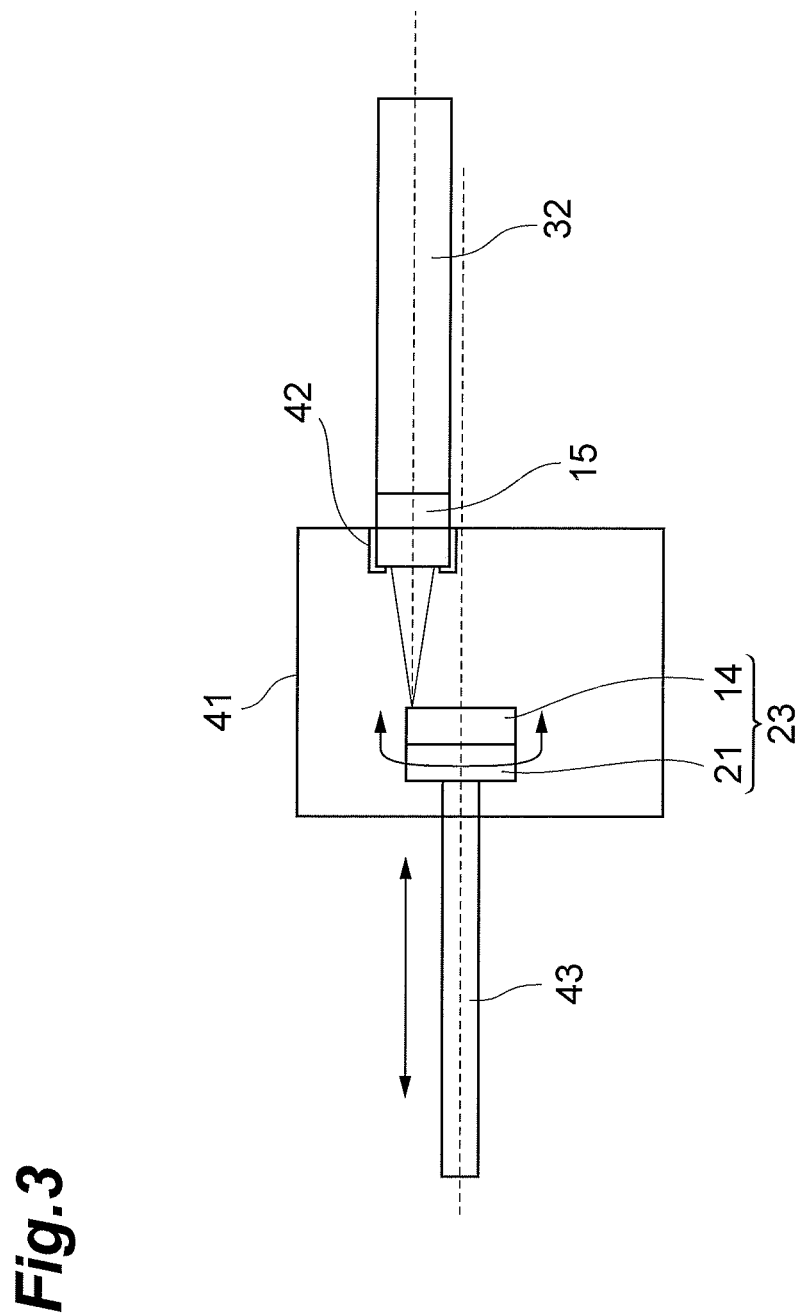
FIG. 3 is a diagram showing the configuration further in detail with the saturable absorber 14 and the gradient index lens 15 in the pulse fiber laser device 1 according to the first embodiment.

FIG. 3 is a diagram showing the configuration further in detail with the saturable absorber 14 and the gradient index lens 15 in the pulse fiber laser device 1 according to the first embodiment. The saturable absorber mirror 23 including the mirror 21 and the saturable absorber 14 is put into a sealed case 41 in consideration of environmental resistance. The position of the gradient index lens 15 provided at the end face of the optical fiber 32 is fixed by being inserted into a groove 42 provided at the sealed case 41, and an optical axis is also fixed in an appropriate direction. The gradient index lens 15 is inserted into the groove 42 provided on the sealed case 41, whereby airtight retention property of the sealed case 41 is increased.

A movable shaft 43 is fixed at the back surface of the mirror 21. This movable shaft 43 can be moved in the axial direction and can be rotationally moved around the axis. A rotation center axis of the movable shaft 43 is perpendicular to the principal surface of each of the mirror 21 and the saturable absorber 14. The rotation center axis of the movable shaft 43 is parallel to the principal ray direction of the light output from the gradient index lens 15, but it is not in agreement with its principal ray.

The movable shaft 43 is moved in the axial direction, whereby it acts as distance adjusting means which adjusts a distance between the saturable absorber 14 and the gradient index lens 15, and thus, a focused beam diameter at the saturable absorber 14 can be adjusted. Furthermore, the movable shaft 43 is rotationally moved around the axis, whereby it acts as position adjusting means which adjusts or changes an incident position of light output from the gradient index lens 15 incident on the saturable absorber 14.

Figure 4:
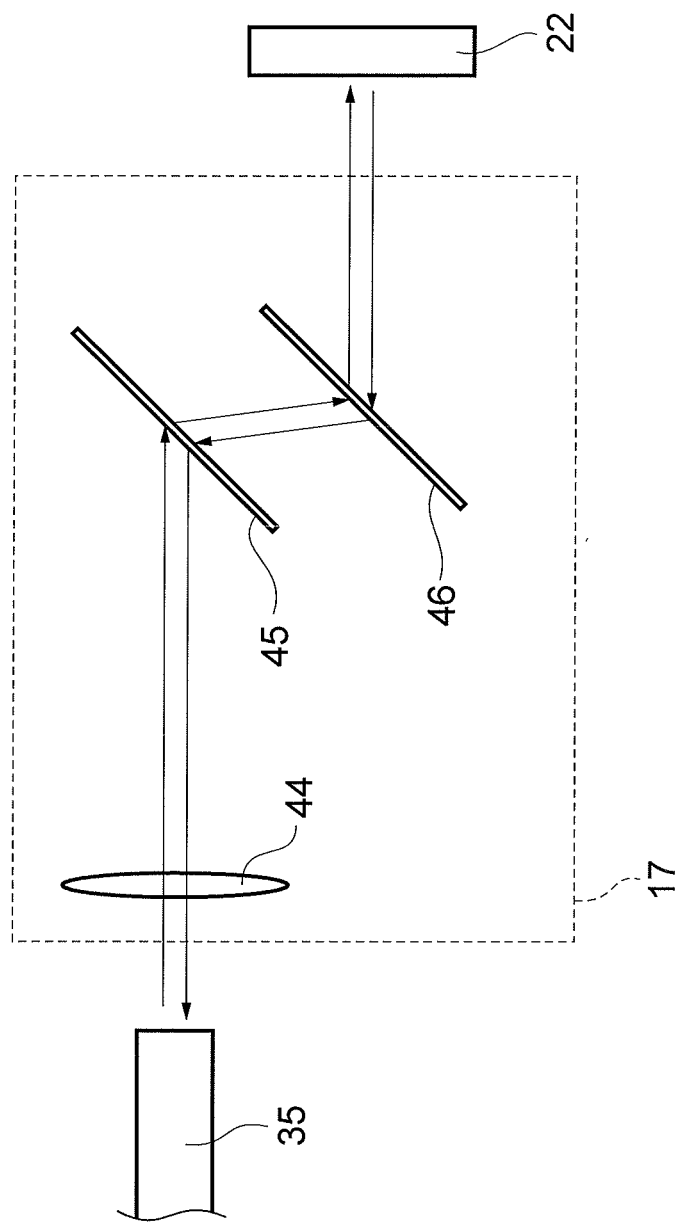
FIG. 4 is a diagram showing a configuration of a dispersion adjusting unit 17 of the pulse fiber laser device 1 according to the first embodiment.

FIG. 4 is a diagram showing a configuration of the dispersion adjusting unit 17 of the pulse fiber laser device 1 according to the first embodiment. The dispersion adjusting unit 17 includes a lens 44 and transmission diffraction gratings 45 and 46, and is used along with the mirror 22 to adjust the wavelength dispersion in the resonant optical path. The lens 44 inputs the light emitted and output from the end face of the optical fiber 35, collimates the light, and outputs the light to the transmission diffraction grating 45. The transmission diffraction grating 45 and the transmission diffraction grating 46 have the same dispersion properties and are arranged in parallel to each other.

The mirror 22 inputs the light output from the end face of the optical fiber 35 and reached through the lens 44 and the transmission diffraction gratings 45 and 46 to reflect the light. The principal ray of the light input into the mirror 22 and the principal ray of the light output from the mirror 22 are coaxial to each other.

For example, the grating pitch of each of the transmission diffraction gratings 45 and 46 is 1250 L/mm. A distance between the transmission diffraction grating 45 and the transmission diffraction grating 46 is from 3.3 mm to 4.0 mm. In this case, positive dispersion occurred when the emitted light at a wavelength of 1030 nm is propagated in the single-mode optical fiber having a length of 4.0 m with reciprocation in the optical resonator can be compensated by the dispersion adjusting unit 17.

In the pulse fiber laser device 1 according to the first embodiment as configured above, dispersion can be suitably compensated by the dispersion adjusting unit 17 as necessary, and loss in optical coupling of respective components can be decreased. The amplifying optical fiber 13 is, for example, a Yb-doped optical fiber, and the excitation light source 11 outputs excitation light having a wavelength of 976 nm of equal to or more than a predetermined power (for example, equal to or more than 100 mW), whereby the pulse fiber laser device 1 according to the first embodiment can perform passive mode locking.

Figure 5:
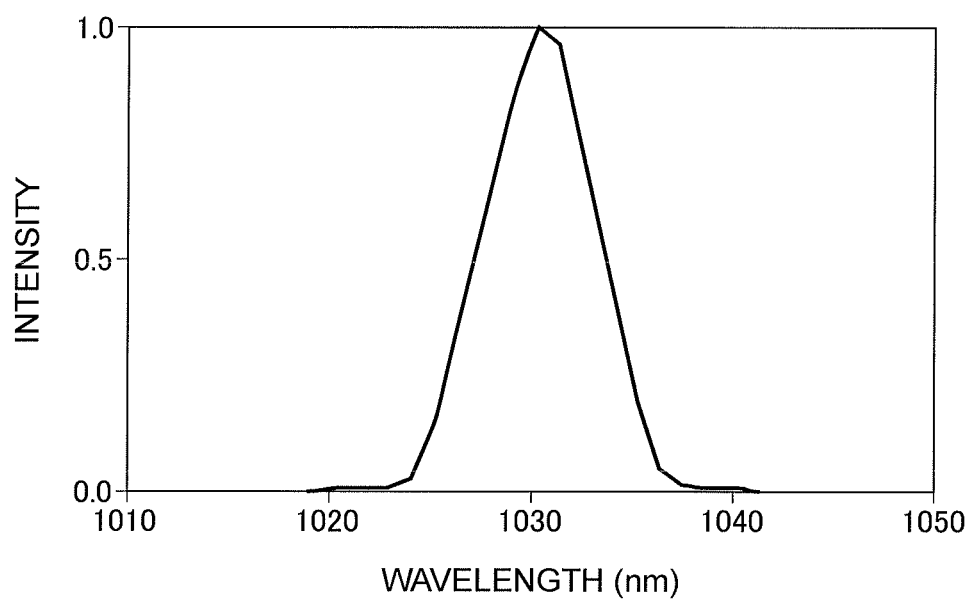
FIG. 5 is a diagram showing a spectrum of laser light output from the pulse fiber laser device 1 according to the first embodiment.
Figure 6:
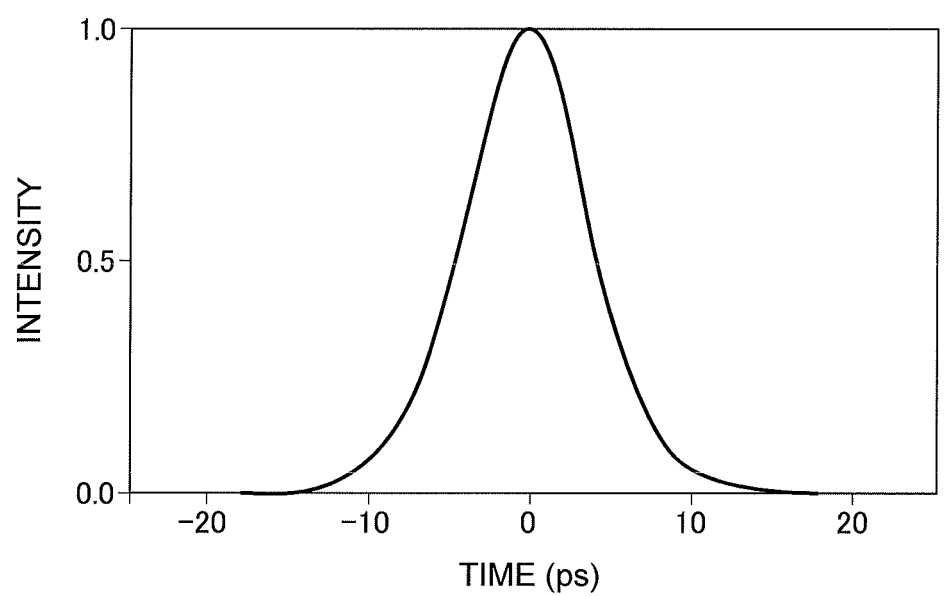
FIG. 6 is a diagram showing a pulse waveform of laser light output from the pulse fiber laser device 1 according to the first embodiment.

FIG. 5 is a diagram showing a spectrum of laser light output from the pulse fiber laser device 1 according to the first embodiment. FIG. 6 is a diagram showing a pulse waveform of laser light output from the pulse fiber laser device 1 according to the first embodiment. The pulse fiber laser device 1 according to the first embodiment can achieve properties of an oscillation wavelength of 1030 nm±5 nm, a pulse width of equal to or less than 5 ps and an average output of 10 mW.

The pulse fiber laser device 1 according to the first embodiment converges the light by the gradient index lens 15 attached to the end face of the optical fiber 32 and allows the light to be incident on the saturable absorber 14, so that it is possible to facilitate miniaturization as compared to the case of using a bulk lens, and to easily adjust the intensity of light incident on the saturable absorber 14. Furthermore, in the pulse fiber laser device 1 according to the first embodiment, startability and stability of mode locking operation can be optimized by adjusting the intensity of light incident on the saturable absorber 14.

A dispersion region capable of achieving operational stability of mode locking and starting characteristics are prescribed by the modulation depth of the reflectance of the saturable absorber mirror 23, and a competitive situation between mode locking operation and Q switching operation is affected by the modulation depth. That is, as the modulation depth of the reflectance of the saturable absorber mirror 23 is large, the dispersion region capable of achieving operational stability of mode locking becomes wide and starting characteristics become excellent, and on the other hand, the problem of competition with Q switching becomes serious.

In the pulse fiber laser device 1 according to the first embodiment, a distance between the saturable absorber 14 and the gradient index lens 15 is adjusted by movement of the movable shaft 43 in the axial direction, whereby a focused beam diameter at the saturable absorber 14 can be maximized within the range capable of performing stable mode locking over a wide dispersion region, and thus, damage risk reduction and long lifetime of the saturable absorber 14 can be sought, and Q switching operation can be suppressed.

Further, in the pulse fiber laser device 1 according to the first embodiment, the incident position of light output from the gradient index lens 15 on the saturable absorber 14 can be adjusted or changed by rotational movement of the movable shaft 43 around the axis, and from this point, damage risk reduction and long lifetime of the saturable absorber 14 can also be sought.

Second Embodiment

Figure 7:
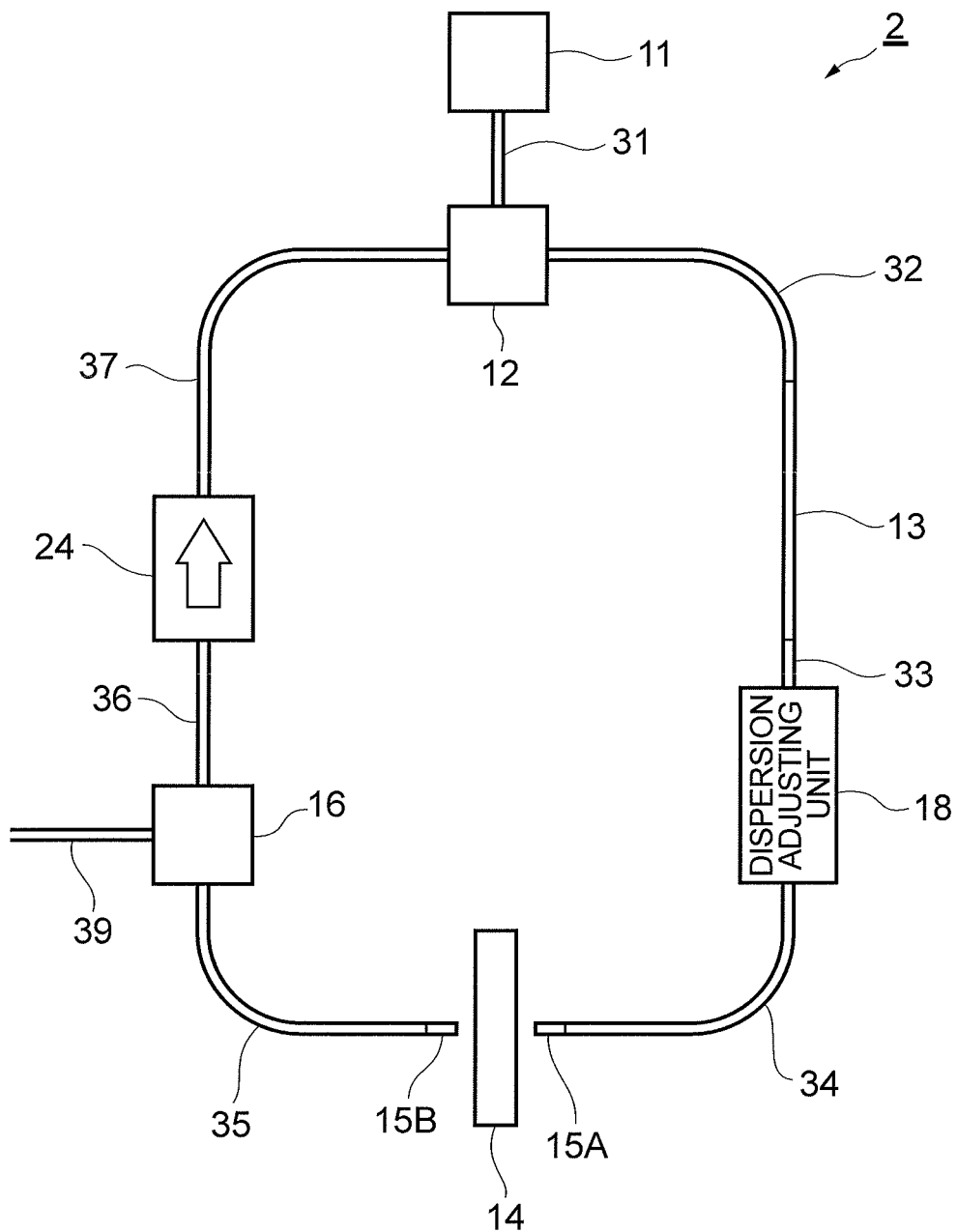
FIG. 7 is a configuration diagram of a pulse fiber laser device 2 according to a second embodiment.

FIG. 7 is a configuration diagram of a pulse fiber laser device 2 according to a second embodiment. The pulse fiber laser device 2 shown in this figure has a ring type optical resonator, and is provided with an excitation light source 11, an optical coupling unit 12, an amplifying optical fiber 13, a saturable absorber 14, a gradient index lens 15A, a gradient index lens 15B, an optical output unit 16, a dispersion adjusting unit 18 and an optical isolator 24.

The excitation light source 11, the optical coupling unit 12, the amplifying optical fiber 13, the saturable absorber 14 and the optical output unit 16 are respectively similar components as the components with the same reference symbols in the first embodiment, however, they are connected in different ways to other components in some cases. Each of the optical coupling unit 12, the amplifying optical fiber 13, the saturable absorber 14, the gradient index lens 15A, the gradient index lens 15B, the optical output unit 16, the dispersion adjusting unit 18 and the optical isolator 24 is arranged on a resonant optical path of the ring type optical resonator, and they are optically connected by a single-mode optical fiber as much as possible.

The optical coupling unit 12 is connected to optical fibers 31, 32 and 37. The optical coupling unit 12 includes, for example, an optical fiber coupler. The optical coupling unit 12 inputs the excitation light output to the optical fiber 31 from the excitation light source 11, and outputs the excitation light to the optical fiber 32. Furthermore, the optical coupling unit 12 inputs the emitted light reached through the optical fiber 37, and outputs the emitted light to the optical fiber 32. The amplifying optical fiber 13 can generate the emitted light by supplying the excitation light from the optical coupling unit 12 through the optical fiber 32.

The dispersion adjusting unit 18 adjusts the wavelength dispersion of the resonant optical path in the wavelength of the emitted light. The dispersion adjusting unit 18 includes a dispersive element such as a diffraction grating or prism. The dispersion adjusting unit 18 inputs the emitted light reached from the amplifying optical fiber 13 through the optical fiber 33, and outputs the dispersion-adjusted emitted light to the optical fiber 34. It is preferable that the dispersion adjusting unit 18 compensates the wavelength dispersion of the amplifying optical fiber 13 and the optical fibers 32 to 37 to decrease the absolute value of entire wavelength dispersion of the resonant optical path in the wavelength of the emitted light.

Each of the gradient index lenses 15A and 15B has an outer shape of a columnar form, and has a refractive index distribution in the radial direction. The gradient index lens 15A is attached to the end face of the optical fiber 34, preferably has an outer diameter equivalent to the outer diameter of the optical fiber 34, and is preferably fusion-connected to the end face of the optical fiber 34. The gradient index lens 15B is attached to the end face of the optical fiber 35, preferably has an outer diameter equivalent to the outer diameter of the optical fiber 35, and is preferably fusion-connected to the end face of the optical fiber 35.

The respective end faces of the optical fiber 34 and the optical fiber 35 are arranged facing each other by inserting the saturable absorber 14 therebetween. The respective optical axes of the gradient index lens 15A and the gradient index lens 15B are coaxial to each other. The gradient index lens 15A converges the light output from the dispersion adjusting unit 18 and reached the end face after being waveguided through the optical fiber 34, and outputs the light to the saturable absorber 14. The gradient index lens 15B inputs the light passing through the saturable absorber 14 after being output from the gradient index lens 15A into the end face of the optical fiber 35.

The optical output unit 16 is connected to optical fibers 35, 36 and 39. The optical output unit 16 includes, for example, an optical fiber coupler. The optical output unit 16 inputs the emitted light reached from the saturable absorber 14 through the optical fiber 35 for branching, that is, outputting a branched part of the emitted light to the optical fiber 39 and outputting the rest of the light to the optical fiber 36. The branching ratio to the optical fiber 39 in the optical output unit 16 is, for example, 30%. That is, the optical output unit 16 outputs a part of the oscillation light emitted from the amplifying optical fiber 13 with excitation light supplied thereto and oscillated in the optical resonator to the outside of the optical resonator.

The optical isolator 24 propagates the light reached from the optical output unit 16 through the optical fiber 36 to the optical fiber 37, but does not propagate the light in the direction of from the optical fiber 37 to the optical fiber 36.

Figure 8:
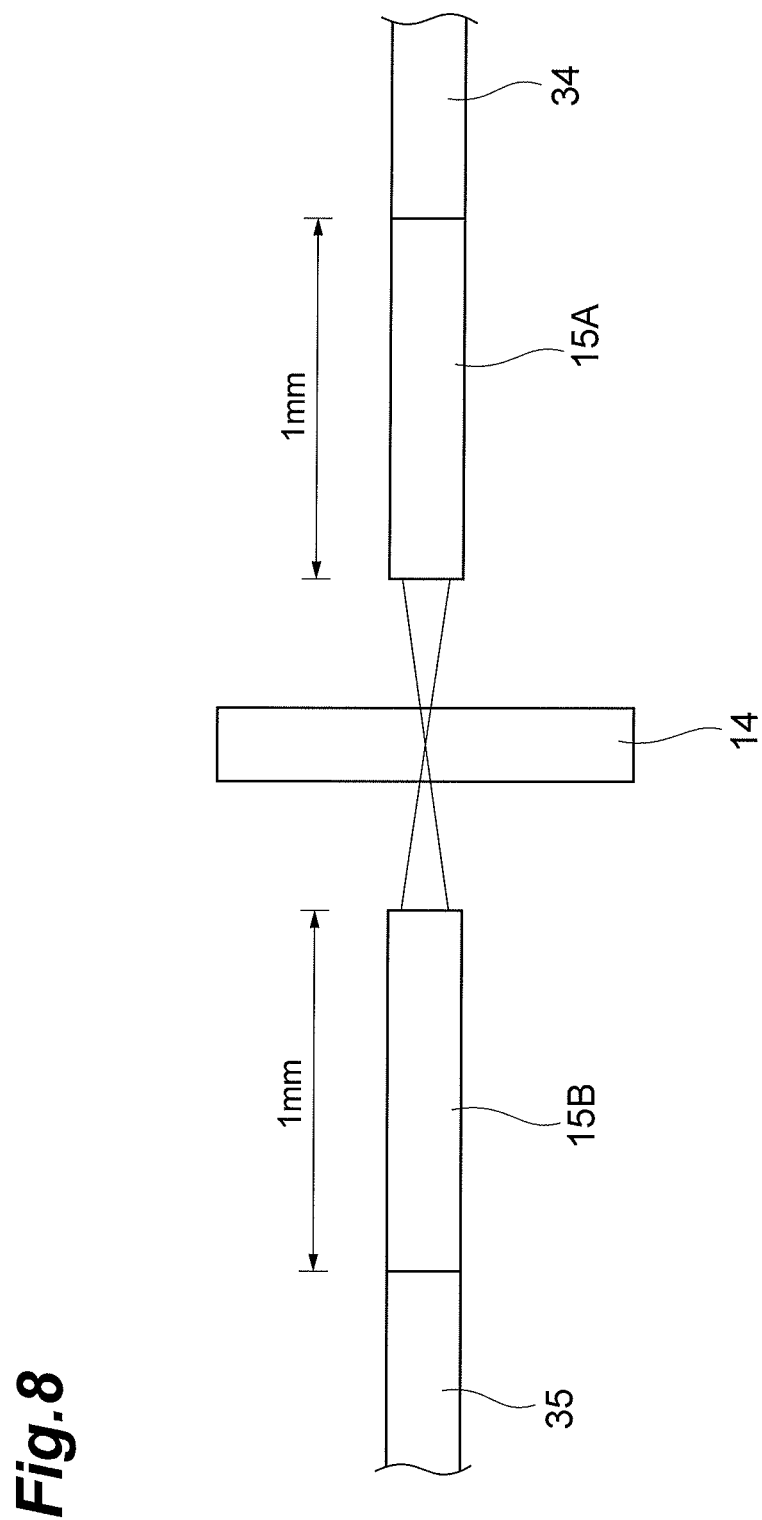
FIG. 8 is a diagram showing a configuration with a saturable absorber 14 and gradient index lenses 15A and 15B in the pulse fiber laser device 2 according to the second embodiment.

FIG. 8 is a diagram showing a configuration with the saturable absorber 14 and the gradient index lenses 15A and 15B in the pulse fiber laser device 2 according to the second embodiment. For example, the outer diameters of the gradient index lenses 15A and 15B are the same as the outer diameters of the optical fibers 34 and 35, that is, 125 µm. The length of each of the gradient index lenses 15A and 15B is 1 mm. NA of each of the gradient index lenses 15A and 15B is from 0.25 to 0.35. The light converged and output from the gradient index lens 15A has a beam waist diameter of 0.01 mm to 0.02 mm at the position of distance 0.3 mm to 0.9 mm from the gradient index lens 15A.

Figure 9:
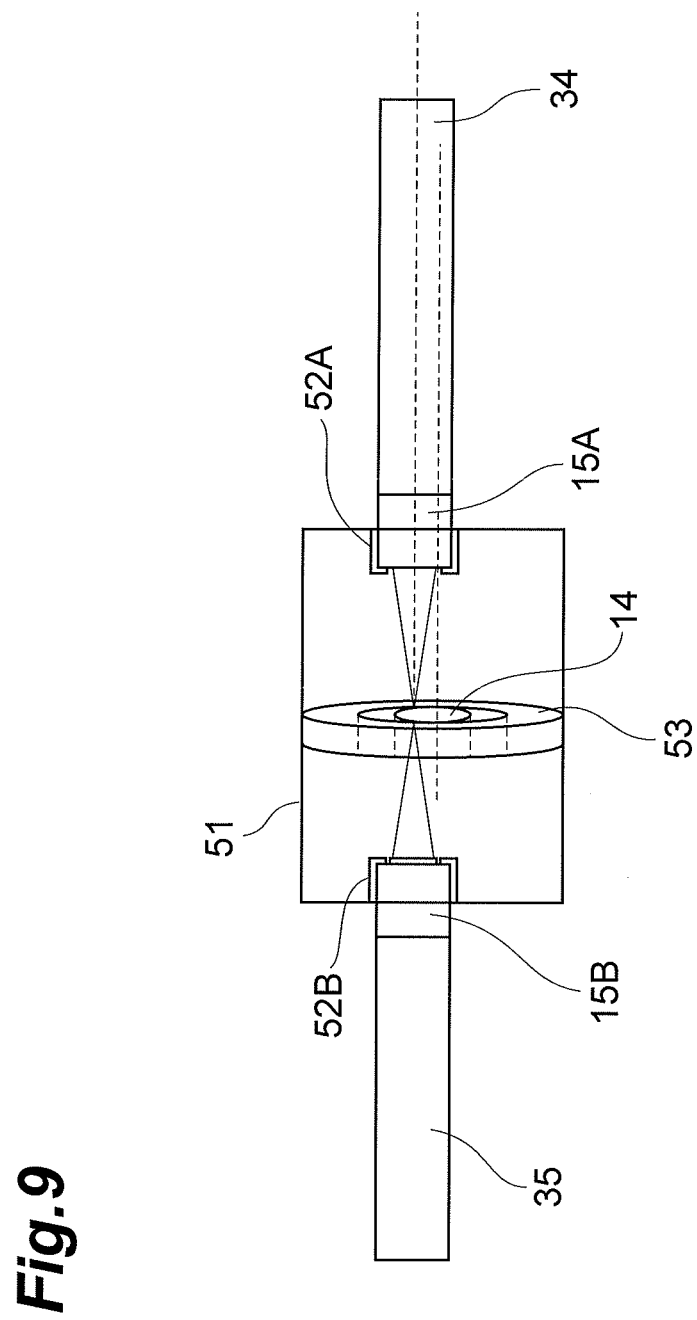
FIG. 9 is a diagram showing the configuration further in detail with the saturable absorber 14 and the gradient index lenses 15A and 15B in the pulse fiber laser device 2 according to the second embodiment.

FIG. 9 is a diagram showing the configuration further in detail with the saturable absorber 14 and the gradient index lenses 15A and 15B in the pulse fiber laser device 2 according to the second embodiment. The saturable absorber 14 is put into a sealed case 51 in consideration of environmental resistance. The position of the gradient index lens 15A provided at the end face of the optical fiber 34 is fixed by being inserted into a groove 52A provided at the sealed case 51, and an optical axis is also fixed in an appropriate direction. Also, the position of the gradient index lens 15B provided at the end face of the optical fiber 35 is fixed by being inserted into a groove 52B provided at the sealed case 51, and an optical axis is also fixed in an appropriate direction. The gradient index lenses 15A and 15B are inserted into the grooves 52A and 52B provided on the sealed case 51, whereby airtight retention property of the sealed case 51 is increased.

A movable mount 53 is fixed at the side of the saturable absorber 14. This movable mount 53 can be moved in the axial direction and can be rotationally moved around the axis. A rotation center axis of the movable mount 53 is perpendicular to the principal surface of the saturable absorber 14. The rotation center axis of the movable mount 53 is parallel to the optical axes of the gradient index lenses 15A and 15B, but it is not in agreement with the optical axes.

The movable mount 53 is moved in the axial direction, whereby it acts as distance adjusting means which adjusts a distance between the saturable absorber 14 and the gradient index lens 15A, and thus, a focused beam diameter at the saturable absorber 14 can be adjusted. Furthermore, the movable mount 53 is rotationally moved around the axis, whereby it acts as position adjusting means which adjusts or changes an incident position of light output from the gradient index lens 15A incident on the saturable absorber 14.

Figure 10:
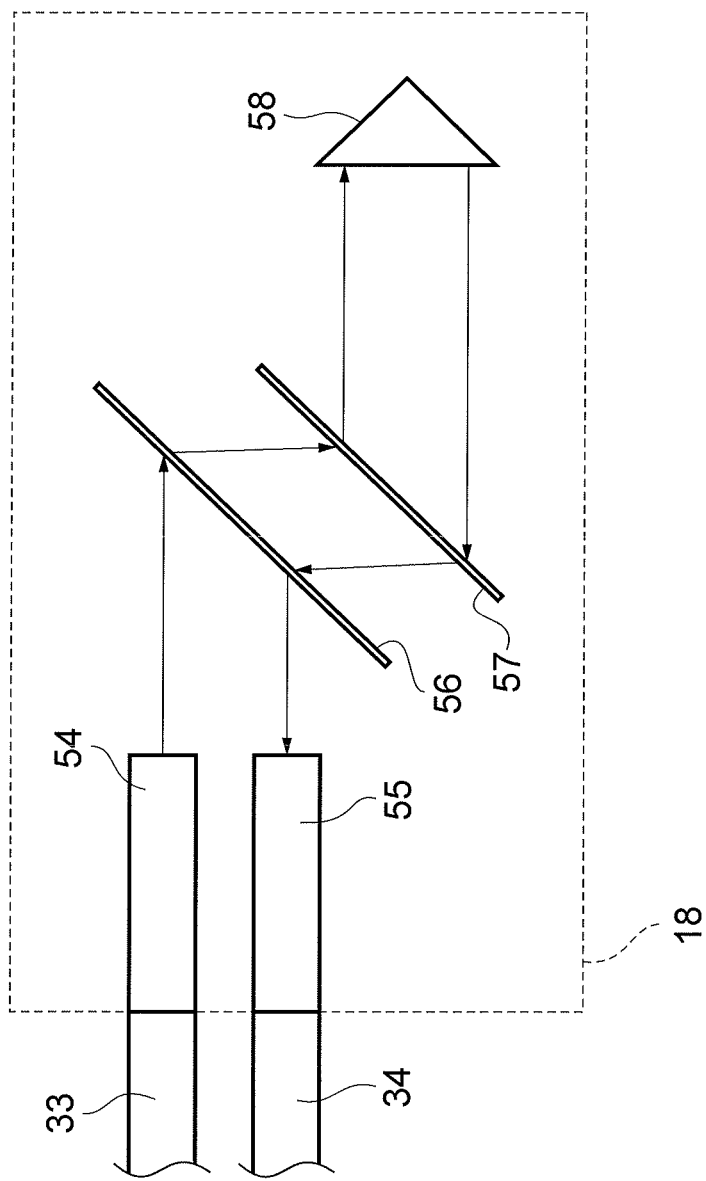
FIG. 10 is a diagram showing a configuration of a dispersion adjusting unit 18 of the pulse fiber laser device 2 according to the second embodiment.

FIG. 10 is a diagram showing a configuration of the dispersion adjusting unit 18 of the pulse fiber laser device 2 according to the second embodiment. The dispersion adjusting unit 18 includes gradient index lenses 54 and 55, transmission diffraction gratings 56 and 57, and a reflecting prism 58, and adjusts the wavelength dispersion in the resonant optical path.

The gradient index lens 54 is attached to the end face of the optical fiber 33, collimates the light output from the end face of the optical fiber 33, and outputs the light to the transmission diffraction grating 56. The transmission diffraction grating 56 and the transmission diffraction grating 57 have the same dispersion properties, and are arranged in parallel to each other. The reflecting prism 58 inputs the light output from the end face of the optical fiber 33 and reached through the gradient index lens 54 and the transmission diffraction gratings 56 and 57 to reflect the light. The principal ray of the light input into the reflecting prism 58 and the principal ray of the light output from the reflecting prism 58 are parallel to each other, but they are not in agreement with each other.

The gradient index lens 55 is attached to the end face of the optical fiber 34, inputs the light reflected at the reflecting prism 58 and reached through the transmission diffraction gratings 57 and 56 and the gradient index lens 55, and inputs this light into the end face of the optical fiber 34.

The pulse fiber laser device 2 according to the second embodiment converges the light by the gradient index lens 15A attached to the end face of the optical fiber 34 and allows the light to be incident on the saturable absorber 14, so that it is possible to facilitate miniaturization as compared to the case of using a bulk lens, and to easily adjust the intensity of light incident on the saturable absorber 14. Furthermore, in the pulse fiber laser device 2 according to the second embodiment, startability and stability of mode locking operation can be optimized by adjusting the intensity of light incident on the saturable absorber 14.

A dispersion region capable of achieving operational stability of mode locking and starting characteristics are prescribed by the modulation depth of the transmittance of the saturable absorber 14, and a competitive situation between mode locking operation and Q switching operation is affected by the modulation depth. That is, as the modulation depth of the transmittance of the saturable absorber 14 is large, the dispersion region capable of achieving operational stability of mode locking becomes wide and starting characteristics become excellent, and on the other hand, the problem of competition with Q switching becomes serious.

In the pulse fiber laser device 2 according to the second embodiment, a distance between the saturable absorber 14 and the gradient index lens 15A is adjusted by movement of the movable mount 53 in the axial direction, whereby a focused beam diameter at the saturable absorber 14 can be maximized within the range capable of performing stable mode locking over a wide dispersion region, and thus, damage risk reduction and long lifetime of the saturable absorber 14 can be sought, and Q switching operation can be suppressed.

Further, in the pulse fiber laser device 2 according to the second embodiment, the incident position of light output from the gradient index lens 15A on the saturable absorber 14 can be adjusted or changed by rotational movement of the movable mount 53 around the axis, and from this point, damage risk reduction and long lifetime of the saturable absorber 14 can also be sought.

The pulse fiber laser device according to the present invention is not limited to the above-described embodiments and configuration examples, and various modifications can be adopted.

The pulse fiber laser device according to the above-described embodiments is provided with (1) an amplifying optical fiber arranged on a resonant optical path of an optical resonator, (2) an excitation light supply unit which supplies excitation light to the amplifying optical fiber, (3) a saturable absorber arranged on the resonant optical path, (4) a first optical fiber which has a first end face opposing to the saturable absorber, guides light on the resonant optical path, and outputs the light from the first end face toward the saturable absorber, (5) a first gradient index lens which is attached to the first end face of the first optical fiber, converges the light output from the first end face of the first optical fiber, and outputs the light to the saturable absorber, and (6) an optical output unit which outputs a part of oscillation light emitted from the amplifying optical fiber with the excitation light supplied from the excitation light supply unit and oscillated in the optical resonator to the outside of the optical resonator.

The pulse fiber laser device having the above configuration may be further provided with distance adjusting means adjusting a distance between the saturable absorber and the first gradient index lens, and may be further provided with position adjusting means adjusting an incident position of the light output from the first gradient index lens incident on the saturable absorber. Furthermore, the device may be further provided with a dispersion adjusting unit adjusting the wavelength dispersion of the resonant optical path.

The pulse fiber laser device having the above configuration may be a Fabry-Perot type device in which an optical resonator reciprocates the light between a first mirror and a second mirror. In this case, it is preferable that the saturable absorber is integrated with any of the first mirror and the second mirror to constitute a saturable absorber mirror, and the first gradient index lens converges the light output from the first end face of the first optical fiber and outputs the light to the saturable absorber mirror, and inputs the light reflected from the saturable absorber mirror into the first end face of the first optical fiber.

The pulse fiber laser device having the above configuration may be a ring type device in which an optical resonator propagates the light in one direction. In this case, it is preferable that the above-described pulse fiber laser device is further provided with (1) a second optical fiber which has a second end face opposing the saturable absorber, inputs the light passing through the saturable absorber after being output from the first end face of the first optical fiber through the first gradient index lens into the second end face, and guides the light on the resonant optical path, and (2) a second gradient index lens which is attached to the second end face of the second optical fiber, and inputs the light passing through the saturable absorber into the second end face of the second optical fiber.

INDUSTRIAL APPLICABILITY

The present invention can be used as a pulse fiber laser device that enables easy adjustment of the intensity of light incident on a saturable absorber and facilitates miniaturization.

REFERENCE SIGNS LIST

1, 2-pulse fiber laser device, 11-excitation light source, 12-optical coupling unit, 13-amplifying optical fiber, 14-saturable absorber, 15, 15A, 15B-gradient index lens, 16-optical output unit, 17, 18-dispersion adjusting unit, 21, 22-mirror, 23-saturable absorber mirror, 24-optical isolator, 31 to 39-optical fiber, 41-sealed case, 42-groove, 43-movable shaft, 44-lens, 45, 46-transmission diffraction grating, 51-sealed case, 52A, 52B-groove, 53-movable mount, 54, 55-gradient index lens, 56, 57-transmission diffraction grating, 58-reflecting prism.

The invention claimed is:

1. A pulse fiber laser device comprising:
an amplifying optical fiber arranged on a resonant optical path of an optical resonator;
an excitation light supply unit supplying excitation light to the amplifying optical fiber;
a saturable absorber arranged on the resonant optical path;

a first optical fiber which has a first end face opposing the saturable absorber, guides light on the resonant optical path, and outputs the light from the first end face toward the saturable absorber;

a first gradient index lens which is attached to the first end face of the first optical fiber, converges the light output from the first end face of the first optical fiber, and outputs the light to the saturable absorber;

an optical output unit outputting a part of oscillation light emitted from the amplifying optical fiber with the excitation light supplied from the excitation light supply unit and oscillated in the optical resonator to the outside of the optical resonator; and distance adjusting means adjusting a distance between the saturable absorber and the first gradient index lens.

2. The pulse fiber laser device according to claim 1, further comprising position adjusting means adjusting an incident position of the light output from the first gradient index lens on the saturable absorber.

3. The pulse fiber laser device according to claim 1, further comprising a dispersion adjusting unit adjusting wavelength dispersion of the resonant optical path.

4. The pulse fiber laser device according to claim 1, wherein the optical resonator is a Fabry-Perot type resonator which reciprocates the light between a first mirror and a second mirror, the saturable absorber is integrated with any of the first mirror and the second mirror to constitute a saturable absorber mirror, and the first gradient index lens converges the light output from the first end face of the first optical fiber and outputs the light to the saturable absorber mirror, and inputs the light reflected from the saturable absorber mirror into the first end face of the first optical fiber.

5. The pulse fiber laser device according to claim 1, wherein the optical resonator is a ring type resonator which propagates the light in one direction, and the device further comprises:

a second optical fiber which has a second end face opposing the saturable absorber, inputs the light passing through the saturable absorber after being output from the first end face of the first optical fiber through the first gradient index lens into the second end face, and guides the light on the resonant optical path; and a second gradient index lens which is attached to the second end face of the second optical fiber and inputs the light passing through the saturable absorber into the second end face of the second optical fiber.

6. A pulse fiber laser device comprising:

an amplifying optical fiber arranged on a resonant optical path of an optical resonator;

an excitation light supply unit supplying excitation light to the amplifying optical fiber;

a saturable absorber arranged on the resonant optical path;

a first optical fiber which has a first end face opposing the saturable absorber, guides light on the resonant optical path, and outputs the light from the first end face toward the saturable absorber;

a first gradient index lens which is attached to the first end face of the first optical fiber, converges the light output from the first end face of the first optical fiber, and outputs the light to the saturable absorber;

an optical output unit outputting a part of oscillation light emitted from the amplifying optical fiber with the excitation light supplied from the excitation light supply unit and oscillated in the optical resonator to the outside of the optical resonator; and position adjusting means adjusting an incident position of the light output from the first gradient index lens on the saturable absorber.

7. The pulse fiber laser device according to claim 6, further comprising a dispersion adjusting unit adjusting wavelength dispersion of the resonant optical path.

8. The pulse fiber laser device according to claim 6, wherein the optical resonator is a Fabry-Perot type resonator which reciprocates the light between a first mirror and a second mirror, the saturable absorber is integrated with any of the first mirror and the second mirror to constitute a saturable absorber mirror, and the first gradient index lens converges the light output from the first end face of the first optical fiber and outputs the light to the saturable absorber mirror, and inputs the light reflected from the saturable absorber mirror into the first end face of the first optical fiber.

9. The pulse fiber laser device according to claim 6, wherein the optical resonator is a ring type resonator which propagates the light in one direction, and the device further comprises:

a second optical fiber which has a second end face opposing the saturable absorber, inputs the light passing through the saturable absorber after being output from the first end face of the first optical fiber through the first gradient index lens into the second end face, and guides the light on the resonant optical path; and a second gradient index lens which is attached to the second end face of the second optical fiber and inputs the light passing through the saturable absorber into the second end face of the second optical fiber.

* * * * *